3,325,280
METHOD OF PRODUCING HIGH-POROUS SINTERPLATES, PREFERABLY FOR ALKALINE ACCUMULATORS
Lutz Horn, Hagen, Westphalia, and Fritz Philipp, Hagen-Haspe, Westphalia, Germany, assignors to Varta Aktiengesellschaft, Hagen, Westphalia, Germany
Filed Jan. 11, 1966, Ser. No. 519,834
Claims priority, application Germany, Jan. 12, 1965, V 27,538
5 Claims. (Cl. 75—201)

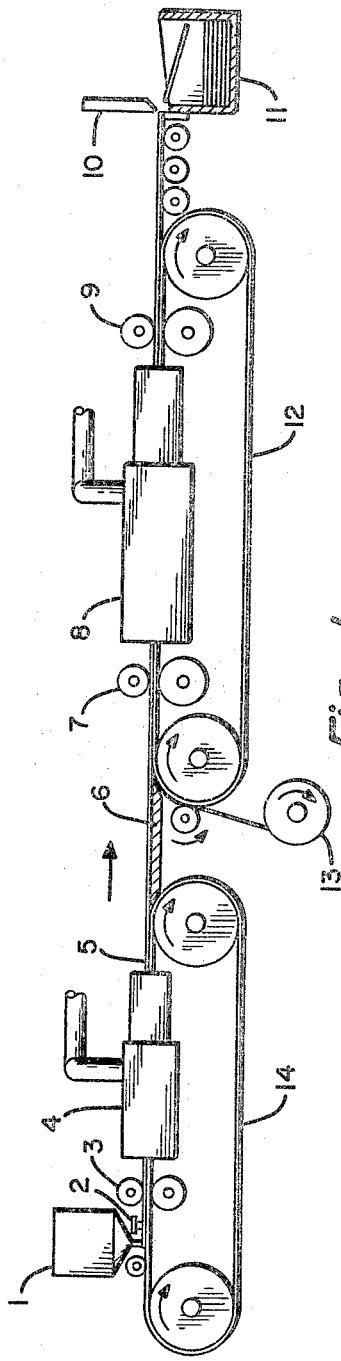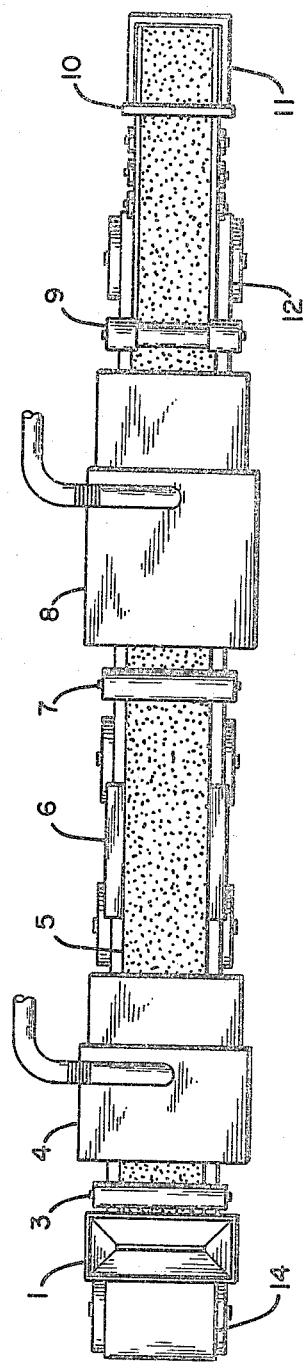

The manufacturing of porous sinter plates of metal powder for the production of electrodes for alkaline accumulators has been known for years. There have also been numerous efforts to increase the pore volume of these sinter plates by adding synthetic powder in the form of synthetic dispersions, which are for the most part lost during the sintering process. Such efforts failed for the reason that the pores which were sought to be formed by the synthetic powder were destroyed by the high temperature sintering required for the metal powder.

The end product has heretofore shown a relatively irregular dispersion of the pore volume resulting in an unequal distribution of the active mass as nickel nitrate, or cadmium-nitrate solvents. Consequently by the previous production method, the electrodes' capacity per unit area cannot be kept constant. The non-uniform dispersion of the pores (micro-pores and macro-pores) results in substantial differences in the capacity, to different current densities at charge and discharge for the several electrodes. As a further result, the plates become distorted or warped and cause short-circuits. These faults are generally known, but have been accepted, since better production methods were not known. Many attempts have been made to eliminate these defects and obtain uniform products.

The method according to the present invention obviates these defects and insures a uniform product in respect to the pore volume, rest-pore volume (after impregnation) and capacity.

We also provide a completely automatic, continuous method of production of sintered plates of any desired thickness for example, of 0.5 to about 4 mm. thickness.

An example of a method of producing sinter-plates of carbonyl-nickel according to our invention is described as follows: The basic material comprises a mixture of about 75 to 85 weight/percentage carbonyl-nickel powder and about 25 to 15 weight/percentage polystyrene powder (in the form of dust), whereby the proportion of polystyrene dust corresponds to the porosity desired. The average diameter of the nickel powder is 1 to 10 microns (preferably 3 to 5 microns) and the polystyrene should be in the 5 to 100 micron size range (preferably 8 to 20 microns). A charge of the powder mixture is fed into a funnel-like feed device which is designed to spread the powder evenly on a continuously moving steel conveyor. The powder is then spread on the conveyor by a rake or doctor blade and the layer is compressed to the desired thickness by applying to the layer an adjustable pressure roller. This roller is applied after the layer has been distributed by the rake and has a peripheral speed which is lower than the lineal speed of the conveyor.

Uniform thickness of the compressed, mixed powder is thereby obtained. In this manner substantially uniform pore volume and uniform distribution of the micro-pores is obtained.

The layer of softly pressed mixture of powders is then passed through a muffle furnace of common type and the polystyrene powder is sintered at about 200° C. By this relatively low temperature treatment the polystyrene powder is stabilized so that the pores defined thereby are not deformed by the further work process. The process then includes the steps of applying a carrier material, for example, nickel-wire-mesh or nickeled perforated steel band, by the final passage through a pressure roller, which joins the carrier material, e.g., nickel-wire-mesh, intimately with the layer of mixed powder which had previously been treated to the sintering temperature of the organic powder.

As the next step, the product including the carrier material is subjected to the sintering temperature of the carbonyl nickel. This is performed at a temperature of about 1000° C. in 10 minutes. The micro-distributed polystyrene powder which had been stabilized by pre-sintering, now volatilizes, forming additional micropores. Displacement and shifting of the nickel powder is prevented by the gas pressure of the volatilizing gases as a result of the stabilization of the polystyrene powder in the pre-sintering heat treatment. Unlike the previous production methods, macro-pores are not formed and the finished sinter-body remains micro-pored. The continuously moving finished sinter-band may be fitted with an edge-fastening by means of a roller arrangement adapted to attach plate lugs by roll-welding.

In the next step, the single plate pieces are separated by flying shears and stapled and finally the plate pieces are impregnated with active material in the usual manner.

The apparatus hereinbefore described is illustrated schematically in the accompanying drawing wherein:

FIGURE 1 is a side elevational view of the apparatus, and

FIG. 2 is a top plan view thereof.

Referring to the drawing, a funnel-like feed device for the mixture of carbonyl-nickel powder and polystyrene powder is indicated at 1 and a rake for spreading the powder uniformly over an endless belt 14 is indicated at 2. This belt is formed from a heat-resistant metal such as steel or other suitable metal belt material. This belt is continuously moved at a suitable rate of speed in the direction indicated by arrows by power actuated means (not shown). Thereupon the layer of powders is compressed on the belt by coacting rollers 3, one of which is adjustable vertically to obtain a layer of the desired thickness. The rollers 3 have a peripheral speed which is lower than the lineal speed of the conveyor whereby a uniform thickness of the compressed mixed powders is obtained. This layer is then passed through a muffle furnace of common type indicated at 4 wherein the polystyrene powder is sintered at about 200° C. The polystyrene powder is thereby stabilized so that the pores defined thereby are not deformed by the subsequent treatment.

At the delivery end of the upper reach of the endless metal conveyor 14, the softly compressed layer of powders is removed from the conveyor 14 and supported on a table 6 during the continuous movement of the powder layer horizontally to a carrier material which is preferably a nickel wire mesh. This mesh band is fed continuously from a roll 13 to an endless conveyor 12 of steel or other suitable material. The layer of powders and mesh band carried by the endless conveyor 12 are then subjected to compression between a pair of rollers 7 and are then passed through a muffle furnace 8 wherein the powders on the carrier material are subjected to a sintering temperature for the carbonyl-nickel, this temperature being approximately 1000° C. The muffle furnace extends along the endless belt a distance such that the plaque material is held at the sintering temperature for about 10 minutes. This treatment causes the polystyrene powder which has been pre-sintered to volatilize and form additional micro-pores of predetermined sizes. The continuously moving finished sinter band may then be fitted with an edge fastening and plate lugs by roll welding between welding rolls 9 and a suitable supporting roll at the lower side of the conveyor 12.

At the delivery end of the conveyor 12 the completed product may be passed over supporting rollers and is then severed into single plate pieces by shears indicated at 10. The individual plates may be collected in a receptacle indicated at 11. Subsequently the plates are impregnated with active material by any suitable or known process.

Plates made according to our invention have a pore volume of 80% to 90%. This compares with plates of previous production methods which resulted in a porosity of about 60% to 65%, and an active mass 40% to 45% was required to obtain the desired capacity, with only 20% rest pore volume retained in the generally known plates. Such rest pore volume compares with our improved rest pore volume of 40% to 45%. By providing this relatively high rest pore volume we afford a larger electrolyte reserve as established by a number of tests, thereby making the battery plates particularly suitable for high charge and discharge currents.

Unlike the previously known sinter methods using mixtures of synthetics, our new method obtains an adjusted sintering of the nickel powder resulting from the preceding carrier-fastening of the sintered synthetic and therefore a substantially improved uniform product.

In case other metal powder-synthetic powder mixtures are used, the pre-sinter and sinter temperatures must be changed accordingly.

We claim:

1. A method for the production of high-porous sinter-plates for alkaline accumulators, wherein a mixture of metal powder and volatilizable synthetic powder is first heated until the synthetic powder is sintered, then the mixture is pressed onto a carrier base, and the pressed mixture is thereafter heated again until the metal powder is sintered and the synthetic powder is substantially volatilized.

2. A method according to claim 1, wherein the mixture is poured on a continuous moving metal conveyor, then uniformly distributed on said conveyor, then compressed to the desired thickness by rolling with a roller having a peripheral speed which is lower than the lineal speed of the conveyor, then passing the compressed layer through a pre-sinter furnace, then securing to the layer a carrier base by passing the layer and carrier base through a pressure roller, and finally sintering the plate at the sintering temperature.

3. A method according to claim 1 wherein the mixture consists of about 75 to 85% by weight of carbonyl-nickel powder and 25 to 15% by weight of polystyrene powder.

4. A method according to claim 3, wherein the mixture is first heated to about 200° C. and finally to about 1000° C. for about 10 minutes.

5. A method in accordance with claim 2 wherein the mixture consists of about 75 to 85% by weight of carbonyl-nickel powder and 25 to 15% by weight of polystyrene powder.

No references cited.

CARL D. QUARFORTH, *Primary Examiner.*

A. J. STEINER, *Assistant Examiner.*